United States Patent
Pal

(10) Patent No.: US 7,837,496 B1
(45) Date of Patent: Nov. 23, 2010

(54) CONTACTOR MOUNTING ASSEMBLY WITH IMPROVED THERMAL CHARACTERISTICS

(75) Inventor: Debabrata Pal, Hoffman Estates, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 12/619,756

(22) Filed: Nov. 17, 2009

(51) Int. Cl.
*H01R 13/00* (2006.01)

(52) U.S. Cl. ..................... 439/485; 361/712

(58) Field of Classification Search ............... 439/485, 439/468, 487, 949; 361/712, 713
See application file for complete search history.

(56) References Cited

U.S. PATENT DOCUMENTS

| | | | |
|---|---|---|---|
| 4,845,589 A | 7/1989 | Weidler et al. | |
| 5,276,587 A | 1/1994 | Ciaccio | |
| 5,594,285 A * | 1/1997 | Wisbey et al. | 307/18 |
| 6,084,764 A | 7/2000 | Anderson | |
| 6,504,730 B1 | 1/2003 | Cooney et al. | |
| 7,193,850 B2 | 3/2007 | Pal | |
| 7,248,483 B2 * | 7/2007 | West | 361/801 |
| 7,275,966 B2 | 10/2007 | Poh et al. | |
| 7,333,337 B2 | 2/2008 | Kita | |
| 7,335,035 B2 | 2/2008 | Shirota | |
| 7,468,889 B2 * | 12/2008 | Su | 361/719 |
| 7,554,804 B2 | 6/2009 | Kunkle | |
| 7,588,456 B2 | 9/2009 | Zhu et al. | |

* cited by examiner

*Primary Examiner*—Hae Moon Hyeon
(74) *Attorney, Agent, or Firm*—Carlson, Gaskey & Olds, P.C.

(57) ABSTRACT

An electrical panel connector has a base plate and multiple posts protruding through the base plate. The posts are connected to the base plate via multiple insulation rings, and each of the insulation rings is electrically resistive and thermally conductive.

20 Claims, 6 Drawing Sheets

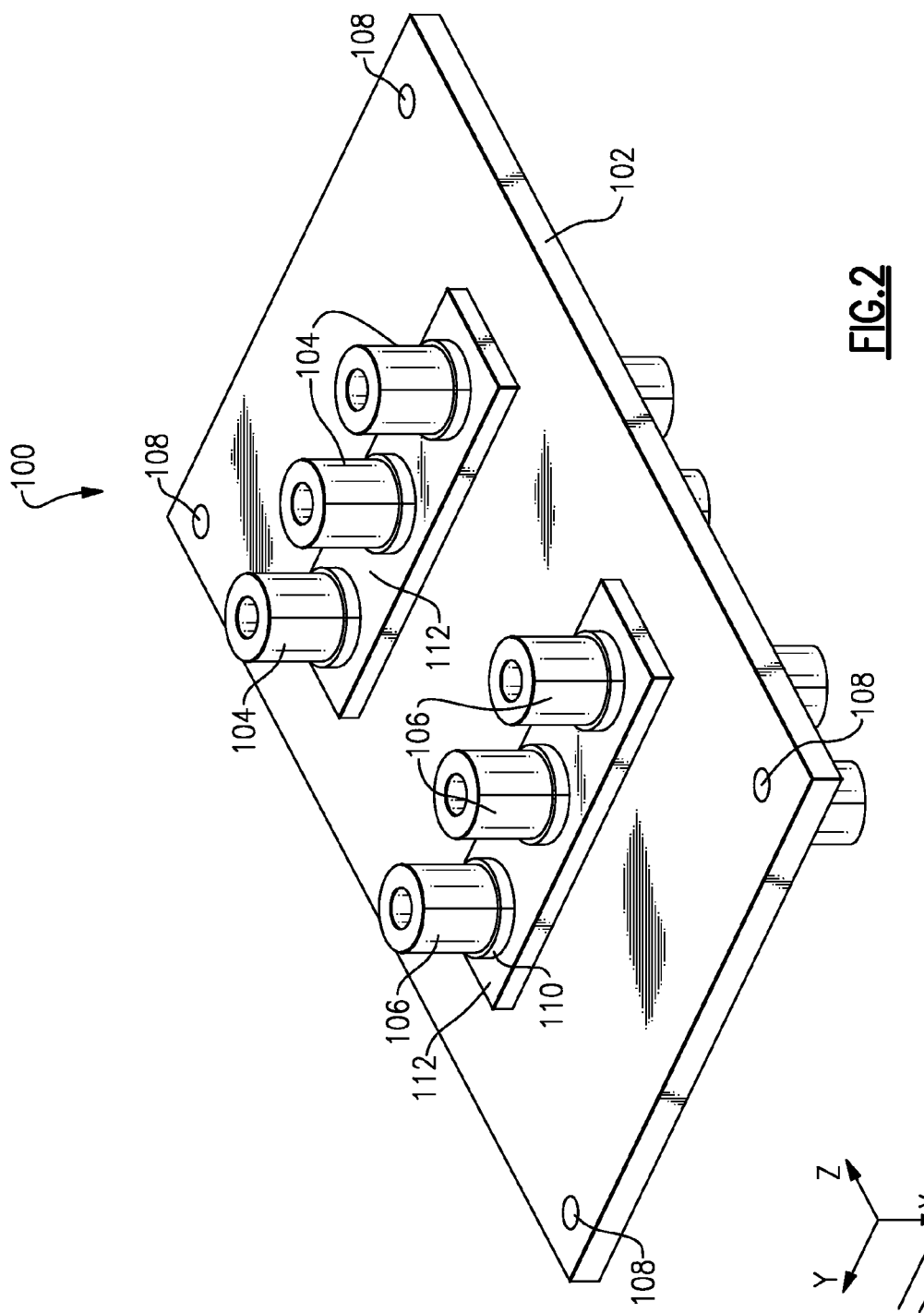

CONTACTOR MOUNTING ASSEMBLY WITH IMPROVED THERMAL CHARACTERISTICS

BACKGROUND OF THE INVENTION

The present disclosure relates generally to the field of electrical contactors and more specifically to an electrical contactor mounting assembly which is capable of dissipating heat into a mounting panel.

Rack and panel contactor assemblies are used in electrical applications, such as aircraft power distribution systems, where power and current flow control of a multi-phase power distribution system is required. A rack and panel contactor assembly typically has a panel on which several electrical contactors are mounted. Known mounting assemblies used to mount electrical contactors to the panels are constructed of thermally and electrically resistive materials, such as plastics.

Each of the contactors is connected to an electrical bus bar, and allows current to flow through the contactor and the corresponding bus bar whenever the contactor is in a closed position. The electrical power and current flow through the contactors is controlled by mechanically actuating a contact plate within the contactor such that, when current flow is desired to pass through the contactor, the contact plate is pushed into electrical contact with two leads and forms an electrical path coupling the leads, thereby allowing current to flow through it. Due to the amount of current traveling from the leads to the connector, waste heat is generated at the contact points and should be removed in order to prevent heat buildup. Additional factors, such as imperfections in the contact surfaces or other imperfections, can add to the amount of waste heat generated.

In order to dissipate the waste heat, previously known contactor mounting assemblies use thermally conductive electrical connections to allow the heat from the contactor to be transmitted to the bus bars connected to each of the contactor's leads. The bus bars then can radiate the heat into the surrounding atmosphere using standard convection techniques.

SUMMARY OF THE INVENTION

An electrical panel connector has a base plate and multiple posts protruding through the base plate. Each of the posts is constructed of an electrically and thermally conductive material. The posts are connected to the base plate via multiple insulation rings, and each of the insulation rings is constructed of an electrically resistive and thermally conductive material. An electrical contactor and an electrical bus bar can be electrically and thermally coupled to each of the posts.

These and other features of the present invention can be best understood from the following specification and drawings, the following of which is a brief description.

BRIEF DESCRIPTION OF THE DRAWINGS

FIG. 2 illustrates an isometric view of a contactor mounting assembly.

DETAILED DESCRIPTION OF THE PREFERRED EMBODIMENT

Figure 1A:
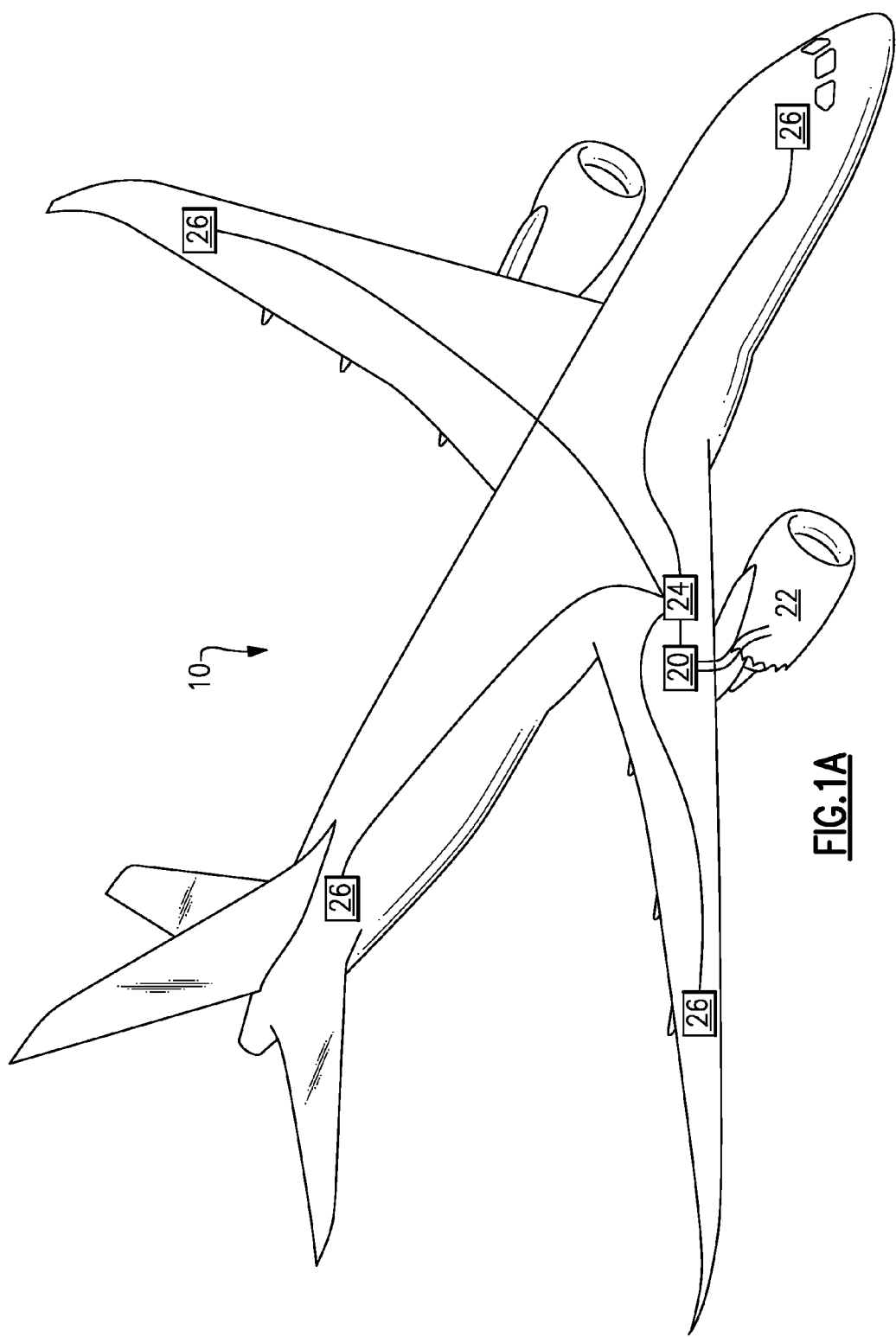
FIG. 1A illustrates a rack and panel assembly in an aircraft power system.

An example aircraft 10 with a panel box 24 for a rack and panel electrical distribution system is illustrated in FIG. 1A. The example aircraft 10 is a commercial jet liner, however it is anticipated that a system according to this disclosure could be used in other types of aircraft. The example aircraft 10 has a power generation system 20, which utilizes rotation within the jet engines 22 to generate three phase electrical power. The power is sent to panel box 24, which contains several electrical buses and contactors for controlling how the power is distributed throughout the aircraft. Through the use of electrical contactors within the panel box 24 power can thereby be turned on and off for each of multiple onboard electronic systems 26 without affecting the other systems. Each contactor is connected to the panel box 24 via a contactor connector, which is described below. Methods for controlling the contactors and the power distribution in a rack and panel system are known, and can be modified by one skilled in the art to be utilized with the present disclosure.

Figure 1B:
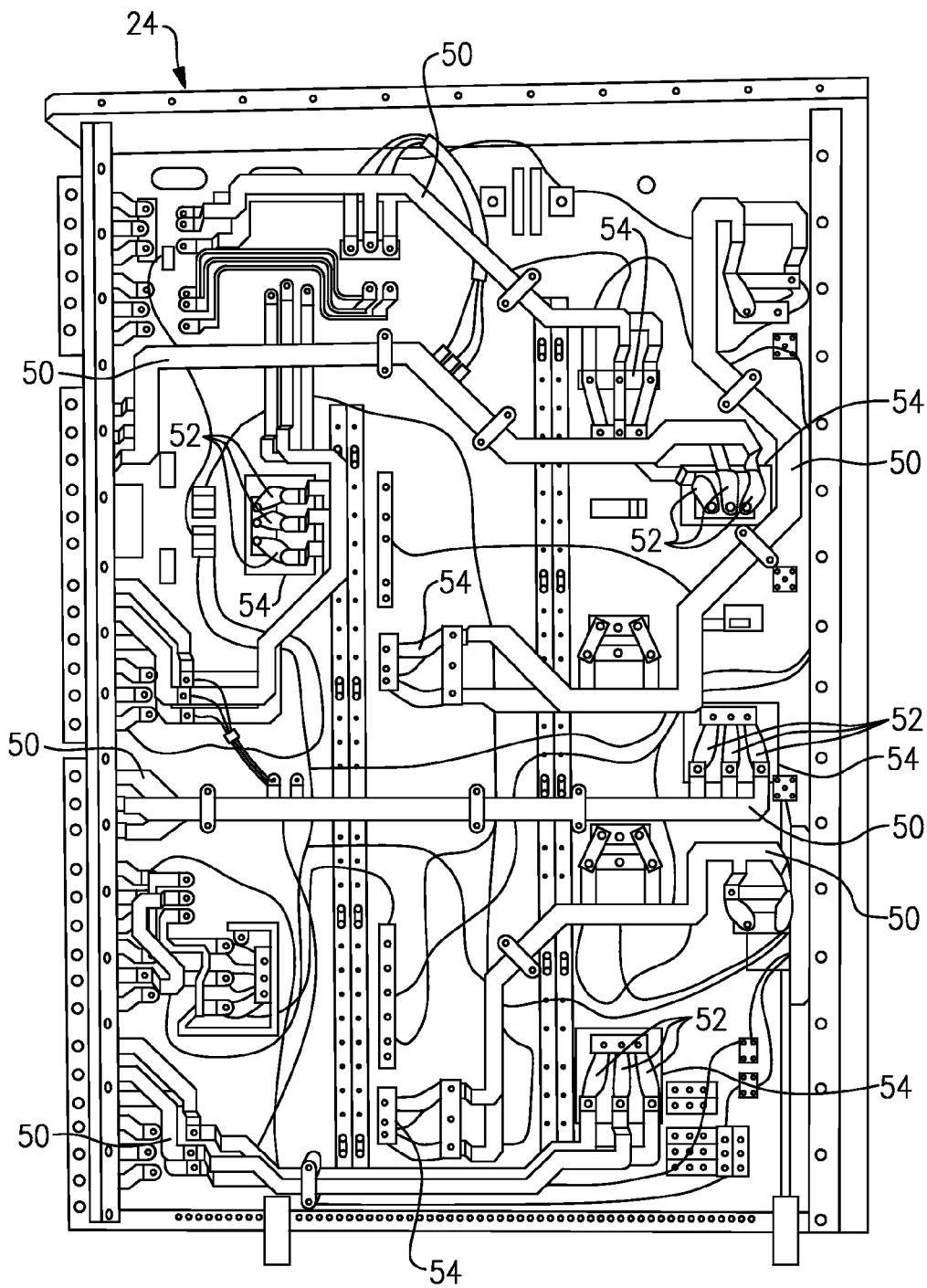
FIG. 1B illustrates a panel box having multiple electrical contactors controlling current flow to multiple bus bars.

An example interior of a panel box 24 from FIG. 1A is illustrated in FIG. 1B. The interior of the panel box 24 has multiple electrical bus bars 50, which are interrupted by electrical contactor connections 52. When the contactor connections 52 are closed, electrical current and heat are allowed to flow between the connected bus bars 50 and a contactor 54. In the known systems, all of the excess heat generated in the contactors 54 is transmitted into the bus bars 50 and radiated into the ambient atmosphere.

FIG. 2 illustrates an example contactor assembly 100 which can be used for connecting an electrical contactor 200 (illustrated in FIG. 3) to bus bars in a rack and panel assembly such as is used in the aircraft 10 of FIG. 1. The contactor assembly 100 has multiple posts 104 for connecting a contactor 200 (illustrated in FIG. 3) to a first side of a three phase bus bar 204 (illustrated in FIG. 3), and multiple posts 106 for connecting the contactor 200 to a second side of a three phase bus bar 204. The contactor assembly 100 additionally has a base plate 102 which has multiple screw holes 108. The connector assembly 100 also has insulation rings 110 connecting each post 106, 104 to the base plate 102, and a structural support 112 for the posts 104, 106.

Figure 3:
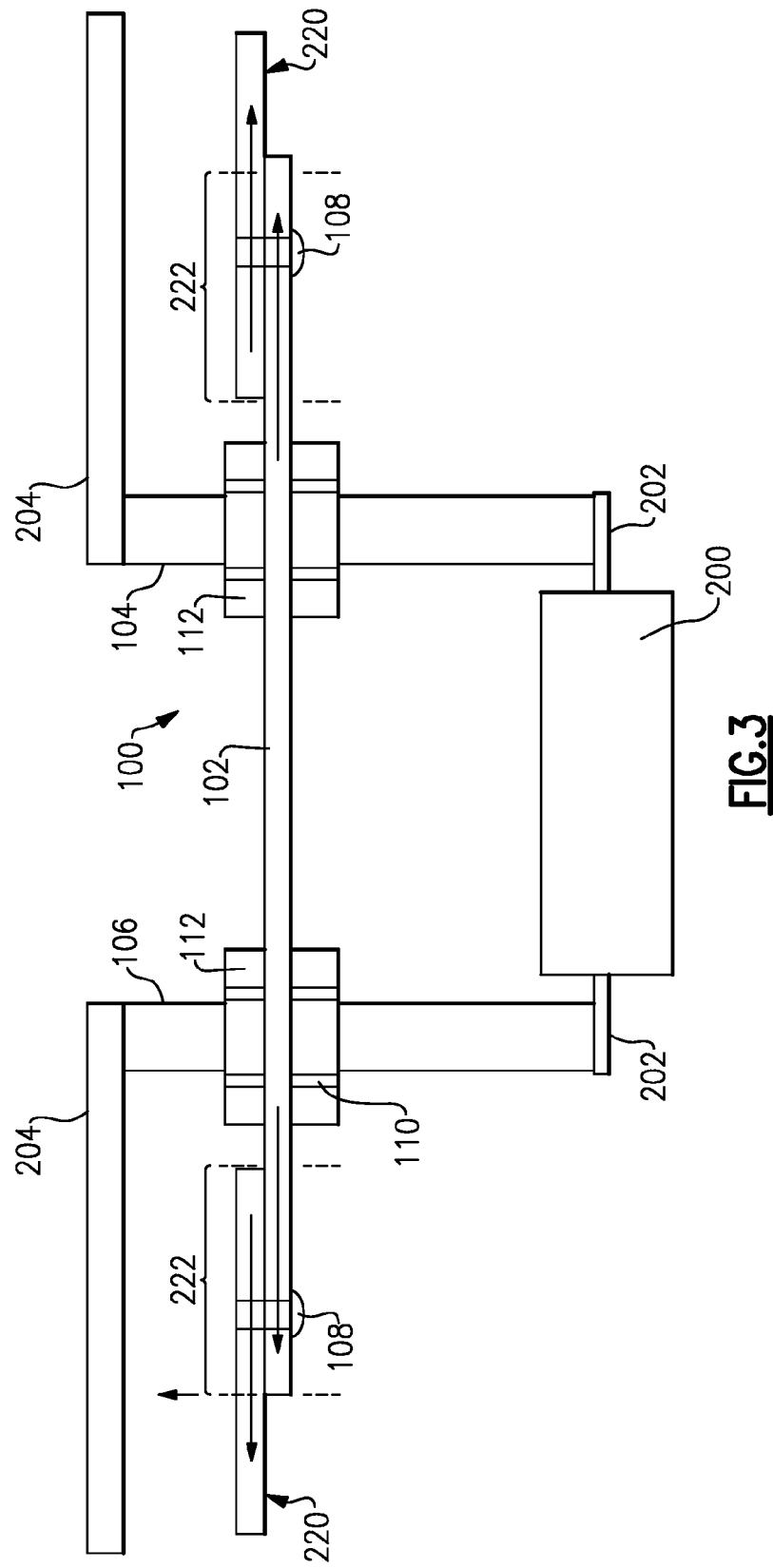
FIG. 3 illustrates a side view of the contactor mounting assembly of FIG. 2.

A side view of the connector assembly 100 of FIG. 2 is illustrated in FIG. 3. An electrical contactor 200 connects the posts 104, 106 of the connector assembly 100 via a set of electrical leads 202 using known electrical and thermal connection techniques. The posts 104, 106 are electrically and thermally coupled to the bus bars 204 of a rack and panel assembly. The screw holes 108 of the base plate 102 correspond to screw holes 208 in the panel 220, and the base plate 102 can be connected to the panel 220 via screws.

The base plate 102, and the structural supports 112 of the connector assembly are electrically and thermally conductive. By way of example, the connector assembly 100 body could be constructed of aluminum or copper. The insulation rings 110, connecting the posts 104, 106 to the connector assembly 100, are thermally conductive and electrically insulative. By way of example, each of the insulation rings 110 could be constructed of aluminum nitride or any similar material. The insulation rings 110 can connect the posts 104, 106 to the base plate 102 and the structural support 112, either through the use of a press fitting technique or the application of a thermally conductive adhesive. Alternatively, the base plate 102 and the structural supports 112 could also be constructed of a thermally conductive and electrically resistive material.

The thermal conductivity of the posts 104, 106 and the insulation rings 110 allow heat to transfer from the contactor 200 into the base plate 102. Simultaneously, the electrical resistivity of the insulation rings 110 prevents electrical current from bleeding into the base plate 102. Heat then transfers through the base plate 102 into a contacting region 222 of the panel 220 due to the physical contact between the connector assembly 100 and the panel 220. Once in the panel 220, the heat conducts throughout the panel 220 and is dissipated into the surrounding air using radiation and convection in the same manner as the heat being dissipated from the bus bars 204 in the known systems. The panel 220 has a significantly larger surface area which is exposed to the ambient atmosphere than bus bars 204, and thus, more heat can be dissipated into the atmosphere, resulting in a higher heat generation tolerance for the contactors 200.

Figure 4:
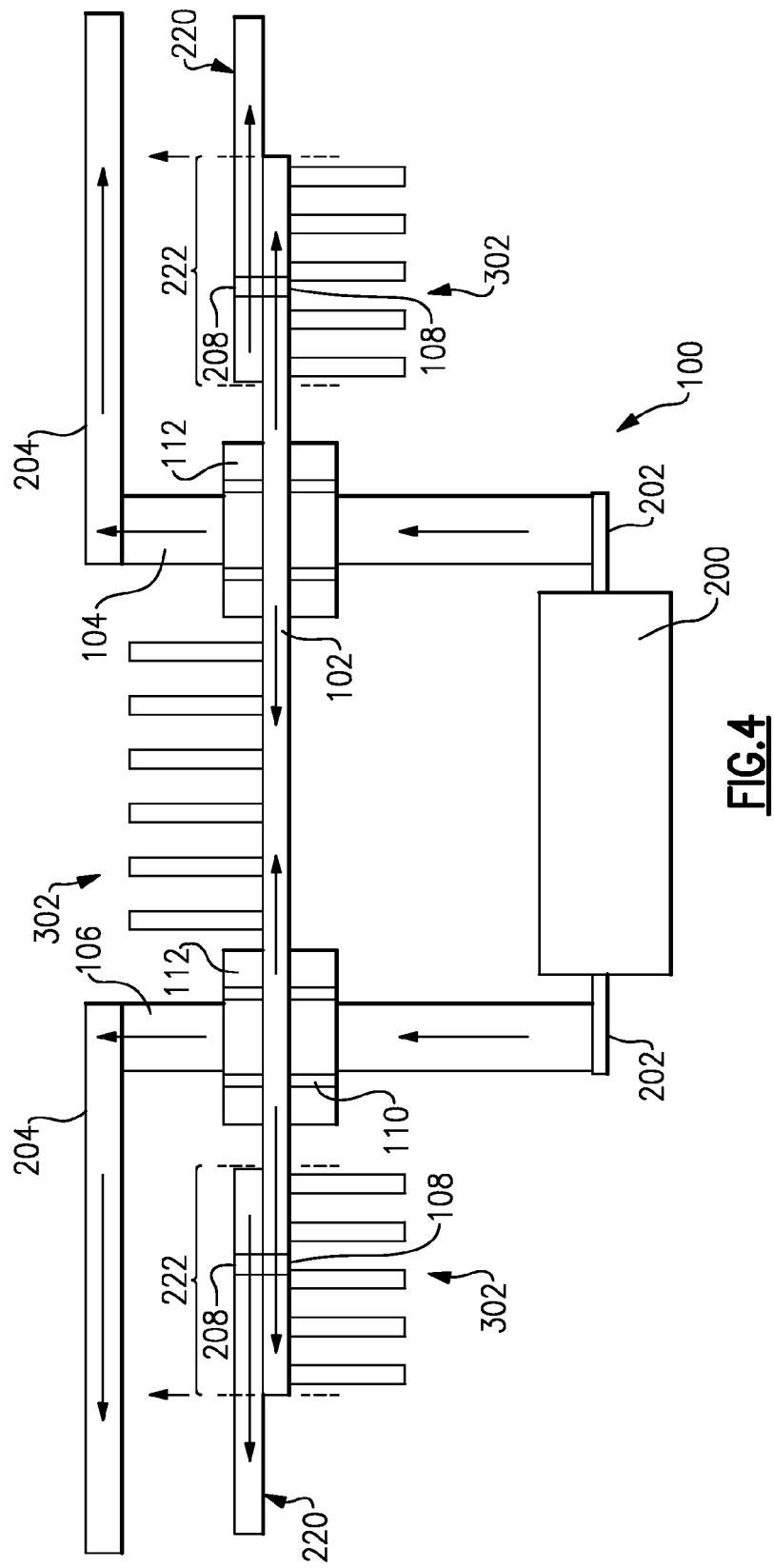
FIG. 4 illustrates a side view of another example contactor mounting assembly.

A second example contactor assembly 300 is illustrated in FIG. 4. The connector assembly 300 of FIG. 4 is constructed similar to the example contactor assembly 100 of FIG. 3 with like numerals indicating like elements. The example of FIG. 4, however, adds cooling fins 302 to the base plate 102 of the contactor assembly 300. The cooling fins 302 aid in heat dissipation by providing additional surface area exposed to the ambient atmosphere and thereby providing additional surface area which heat can be dissipated from. The cooling fins 302 can be a separate component thermally coupled to the base plate 102, or the cooling fins 302 may be constructed along with the base plate 102 as a single piece. Furthermore, the cooling fins 302 may be located on any portion of the base plate 102, depending on design and space constraints.

Figure 5:
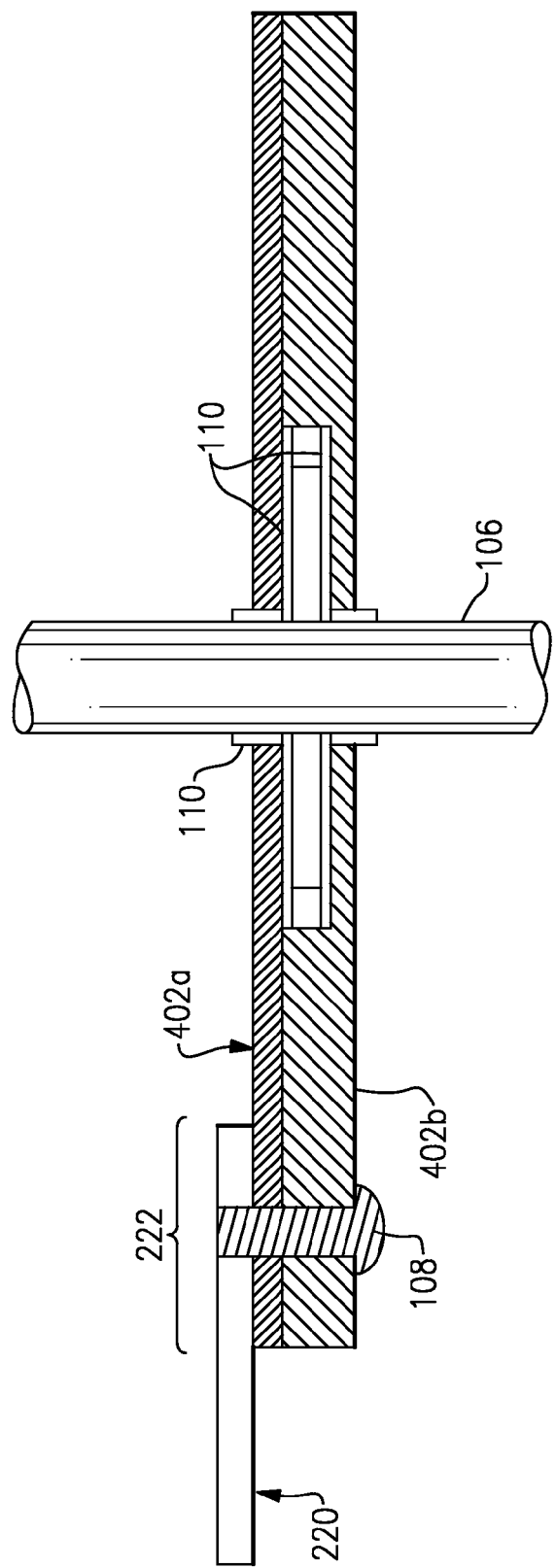
FIG. 5 illustrates a side view of a post portion of another example contactor assembly.

FIG. 5 illustrates an alternate possible example of the post 106 and insulation ring 110 assembly. The insulation ring 110 is split into two parts each having a vertical and horizontal component. The horizontal components sandwich a portion of the post 106, which protrudes radially away from the post 106 and hold the post 106 in place. The base plate 402 is constructed of a first plate 402a and a second plate 402b, which are affixed together and hold the post 106 in place.

While the above embodiments have been described with reference to an aircraft rack and panel assembly, it is anticipated that the examples could be used in conjunction with any electrical contactor connector assembly and still fall within this disclosure.

Although multiple examples of this invention have been disclosed, a worker of ordinary skill in this art would recognize that certain modifications would come within the scope of this invention. For that reason, the following claims should be studied to determine the true scope and content of this invention.

What is claimed is:

1. An electrical panel connector comprising,
   a base plate;
   a plurality of posts protruding through said base plate, each of said plurality of posts being constructed from an electrically and thermally conductive material;
   a plurality of insulation rings connecting said plurality of posts to said base plate, wherein each of said insulation rings is constructed of an electrically insulative and thermally conductive material; and
   each of said posts having a first end capable of electrically and thermally connecting to an electrical contactor, and a second end capable of electrically and thermally connecting to an electrical bus bar.

2. The electrical panel connector of claim 1, wherein said insulation ring is at least partially constructed of aluminum nitride.

3. The electrical panel connector of claim 1, wherein said insulation rings are affixed to said posts and said base plate via a thermally conductive adhesive.

4. The electrical panel connector of claim 1, wherein said insulation rings are affixed to said posts and said base plate via press fitting.

5. The electrical panel connector of claim 1, wherein said electrical panel connector further comprises a structural support for supporting each of said plurality of posts.

6. The electrical panel connector of claim 1, wherein said base plate further comprises a finned portion having at least one fin with a component perpendicular to said base plate.

7. The electrical panel connector of claim 6, wherein said finned portion comprises a plurality of fins, each of said fins being thermally conductive.

8. The electrical panel connector of claim 6, wherein the majority of a surface area of said finned portion is exposed to an ambient environment.

9. The electrical panel connector of claim 1, wherein said base plate comprises an overlapping region, and said overlapping region further comprises a surface which contacts a panel when said electrical panel connector is connected to said panel.

10. The electrical panel connector of claim 9, wherein said overlapping region comprises at least one through hole for connecting said electrical panel connector to said panel.

11. The electrical panel connector of claim 9, wherein said contact between said overlapping region and said panel comprises a thermally conductive coupling.

12. The electrical panel connector of claim 1, wherein said base plate is constructed at least partially of aluminum or copper.

13. An electrical panel box assembly comprising;
   a plurality of bus bars;
   a plurality of electrical contactors; and
   a plurality of electrical panel connectors connecting said electrical contactors to said bus bars, each of said electrical panel connectors comprising;
   a base plate;
   a plurality of posts protruding through said base plate, each of said plurality of posts being constructed from an electrically and thermally conductive material;
   a plurality of insulation rings connecting said plurality of posts to said base plate, wherein each of said insulation rings is constructed of an electrically insulative and thermally conductive material; and
   each of said posts having a first end capable of electrically and thermally connecting to an electrical contactor, and a second end capable of electrically and thermally connecting to an electrical bus bar.

14. The electrical panel box assembly of claim 13, wherein each of said electrical panel connectors further comprises a structural support for supporting each of said plurality of posts.

15. The electrical panel box assembly of claim 13, wherein said base plate further comprises a finned portion having at least one fin with a component perpendicular to said base plate.

16. The electrical panel box assembly of claim 15, wherein said finned portion comprises a plurality of fins, each of said fins being thermally conductive.

17. The electrical panel box assembly of claim 15, wherein the majority of a surface area of said finned portion is exposed to an ambient environment.

18. The electrical panel box assembly of claim 13, wherein said base plate comprises an overlapping region, and said overlapping region further comprising a surface which contacts a panel when said electrical panel connectors are connected to said panel.

19. The electrical panel box assembly of claim 18, wherein said overlapping region comprises at least one through hole for connecting each of said electrical panel connectors to said panel.

20. The electrical panel box assembly of claim 18, wherein said contact between said overlapping region and said panel comprises a thermally conductive coupling.

* * * * *